US012437777B2

(12) United States Patent
Kulkarni et al.

(10) Patent No.: US 12,437,777 B2
(45) Date of Patent: Oct. 7, 2025

(54) METHOD AND APPARATUS FOR TARGET SOUND DETECTION

(71) Applicant: QUALCOMM Incorporated, San Diego, CA (US)

(72) Inventors: Prajakt Kulkarni, San Diego, CA (US); Yinyi Guo, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/544,173

(22) Filed: Dec. 18, 2023

(65) Prior Publication Data

US 2024/0135959 A1    Apr. 25, 2024

Related U.S. Application Data

(63) Continuation of application No. 16/837,420, filed on Apr. 1, 2020, now Pat. No. 11,862,189.

(51) Int. Cl.
*G10L 25/78*   (2013.01)
*G06F 18/211*  (2023.01)
(Continued)

(52) U.S. Cl.
CPC .......... *G10L 25/78* (2013.01); *G06F 18/211* (2023.01); *G06F 18/241* (2023.01); *G10L 15/16* (2013.01);
(Continued)

(58) Field of Classification Search
CPC ......... G10L 25/78; G10L 15/16; G06F 18/21; G06F 18/241; H04W 52/0229; H04W 51/0261
(Continued)

(56) References Cited

U.S. PATENT DOCUMENTS 8,898,496 B1   11/2014  Chi
9,412,361 B1 *  8/2016  Geramifard .......... G06V 10/811
(Continued)

FOREIGN PATENT DOCUMENTS

CN    105812573 A    7/2016
CN    109243442 A    1/2019
(Continued)

OTHER PUBLICATIONS

R. V. Cox, B. G. Haskell, Y. LeCun, B. Shahraray and L. Rabiner, "On the applications of multimedia processing to communications ," in Proceedings of the IEEE, vol. 86, No. 5, pp. 755-824, May 1998, doi: 10.1109/5.664272. keywords: {Multimedia communication; Multimedia systems; Speech synthesis; Telephon (Year: 1998).*

(Continued)

*Primary Examiner* — Bharatkumar S Shah
(74) *Attorney, Agent, or Firm* — QUALCOMM Incorporated; Espartaco Diaz Hidalgo

(57) ABSTRACT

A device to perform target sound detection includes a memory including a buffer configured to store audio data. The device includes one or more processors coupled to the memory. The one or more processors are configured to receive the audio data from the buffer. The one or more processors are configured to detect the presence or absence of one or more target non-speech sounds in the audio data. The one or more processors are further configured to generate a user interface signal, to indicate one of the one or more target non-speech sounds has been detected, and provide the user interface signal to an output device. The device further comprises the output device that is configured to output a visual representation associated with the one of the one or more target non-speech sounds has been detected.

27 Claims, 9 Drawing Sheets

(51) Int. Cl.
*G06F 18/241* (2023.01)
*G10L 15/16* (2006.01)
*H04W 52/02* (2009.01)

(52) U.S. Cl.
CPC ... *H04W 52/0229* (2013.01); *H04W 52/0261* (2013.01)

(58) Field of Classification Search
USPC .......................................................... 704/200
See application file for complete search history.

(56) References Cited

U.S. PATENT DOCUMENTS

| | | | |
|---|---|---|---|
| 9,749,528 | B1 | 8/2017 | Fink et al. |
| 9,992,745 | B2* | 6/2018 | Hwang ................. H04W 52/02 |
| 10,121,494 | B1 | 11/2018 | Sundaram et al. |
| 10,770,092 | B1* | 9/2020 | Adams .................... G10L 21/18 |
| 10,783,434 | B1 | 9/2020 | Mitchell et al. |
| 10,878,840 | B1 | 12/2020 | Mitchell et al. |
| 2013/0339028 | A1 | 12/2013 | Rosner et al. |
| 2015/0112673 | A1 | 4/2015 | Nandy et al. |
| 2015/0301796 | A1 | 10/2015 | Visser et al. |
| 2016/0096270 | A1 | 4/2016 | Ibarz et al. |
| 2016/0125877 | A1 | 5/2016 | Foerster et al. |
| 2017/0270919 | A1 | 9/2017 | Parthasarathi et al. |
| 2018/0047414 | A1 | 2/2018 | Kasilya Sudarsan et al. |
| 2018/0108369 | A1 | 4/2018 | Gross |
| 2019/0259378 | A1 | 8/2019 | Khadloya et al. |
| 2019/0311720 | A1 | 10/2019 | Pasko |
| 2021/0035571 | A1* | 2/2021 | Yun ...................... G06V 10/143 |
| 2021/0118467 | A1* | 4/2021 | Chen ...................... G06N 20/20 |
| 2021/0193155 | A1* | 6/2021 | Mitchell ............ H04N 1/00395 |
| 2021/0249011 | A1* | 8/2021 | Patage .................... G10L 15/22 |
| 2021/0312943 | A1 | 10/2021 | Kulkarni et al. |
| 2022/0335966 | A1* | 10/2022 | Ayllón Álvarez ...... G10L 15/02 |
| 2023/0353707 | A1* | 11/2023 | Astarabadi .............. G06T 11/20 |

FOREIGN PATENT DOCUMENTS

| | | |
|---|---|---|
| CN | 110619890 A | 12/2019 |
| CN | 112233694 A | 1/2021 |
| EP | 1619863 A1 | 1/2006 |
| GB | 2577570 A | 4/2020 |
| JP | 2018163293 A | 10/2018 |
| JP | 2019508787 A | 3/2019 |
| WO | WO-2013066523 A2 | 5/2013 |
| WO | 2015069878 A1 | 5/2015 |
| WO | 2017029044 A1 | 2/2017 |

OTHER PUBLICATIONS

Y. Yang, B. Lee, J. S. Cho, S. Kim and H. Lee, "A Digital Capacitive MEMS Microphone for Speech Recognition With Fast Wake-Up Feature Using a Sound Activity Detector," in IEEE Transactions on Circuits and Systems II: Express Briefs, vol. 67, No. 9, pp. 1509-1513, Sep. 2020, doi: 10.1109/TCSII.2020.3 (Year: 2020).*
R. V. Cox, B. G. Haskell, Y. LeCun, B. Shahraray and L. Rabiner, "On the applications of multimedia processing to communications ," in Proceedings of the IEEE, vol. 86, No. 5, pp. 755-824, May 1998, doi: 10.1109/5.664272. keywords: {Multimedia communication; Multimedia systems; Speech synthesis; Teleph (Year: 1998).*
Y. Yang, B. Lee, J. S. Cho, S. Kim and H. Lee, "A Digital Capacitive MEMS Microphone for Speech Recognition With Fast U_l Wake-Up Feature Using a Sound Activity Detector," in IEEE Transactions on Circuits and Systems II: Express Briefs, vol. 67, No. 9, pp. 1509-1513, Sep. 2020, doi: 10.1109/TCSII.20 (Year: 2020).*
R. V. Cox, B. G. Haskell, Y. LeCun, B. Shahraray and L. Rabiner, "On the applications of multimedia processing to communications V_l ,"in Proceedings of the IEEE, vol. 86, No. 5, pp. 755-824, May 1998, doi: 10.1109/5.664272. keywords: {Multimedia communication; Multimedia systems; Speech synthesis; Te (Year: 1998).*
International Preliminary Report on Patentability—PCT/US2021/020220 The International Bureau of WIPO—Geneva, Switzerland, Oct. 13, 2022.
International Search Report and Written Opinion—PCT/US2021/020220—ISA/EPO—Jun. 14, 2021.
Purwins H., et al., "Deep Learning for Audio Signal Processing", IEEE Journal of Selected Topics in Signal Processing, vol. 14, No. 8, May 2019, pp. 1-14.
Ruckert E., et al., "Fast and Robust Real Time Speaker Tracking Using Multichannel Audio and a Particle Filter", Oct. 5, 2008 (Oct. 5, 2008), pp. 1-7, XP055807613, Retrieved from the Internet: URL: https://www.academia.edu/download/47078750/Fast_and_robust_realtime_speaker_trackin20160707-22582-tld74z.pdf [retrieved on May 26, 2021] Abstract; figures 1-8 cols. 1. 6. 9.
Dennis J.W., "Sound Event Recognition in Unstructured Environments Using Spectrogram Image Processing", Nanyang Technological university, Jan. 1, 2014, 204 Pages, XP055604914.
Lu H., et al., "SoundSense; Scalable Sound Sensing for People—Centric Applications on Mobile Phones", Proceedings of the The International Conference on Mobile Systems, Applications, and Services, Mobisys '09, ACM Press, New York, USA, Jun. 22, 2009, pp. 165-178, XP058391135.

* cited by examiner

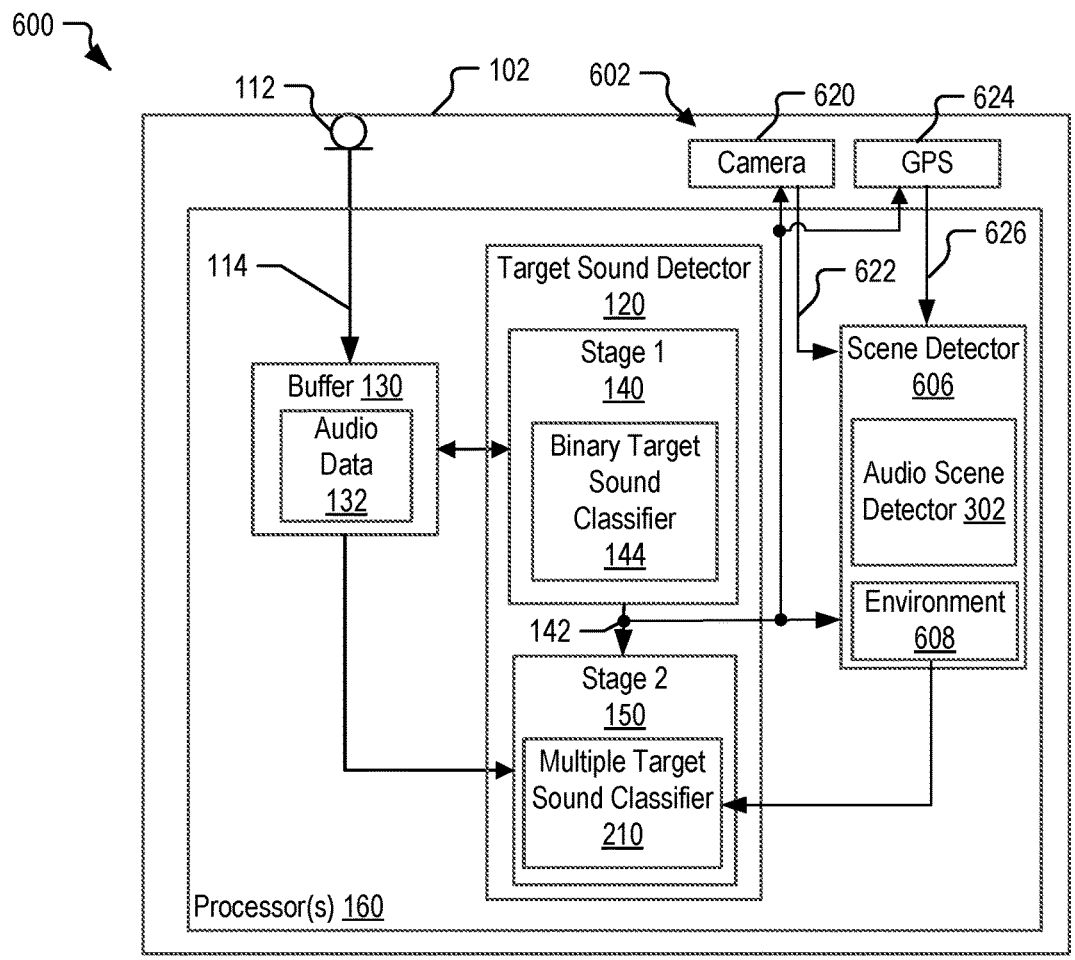
FIG. 6
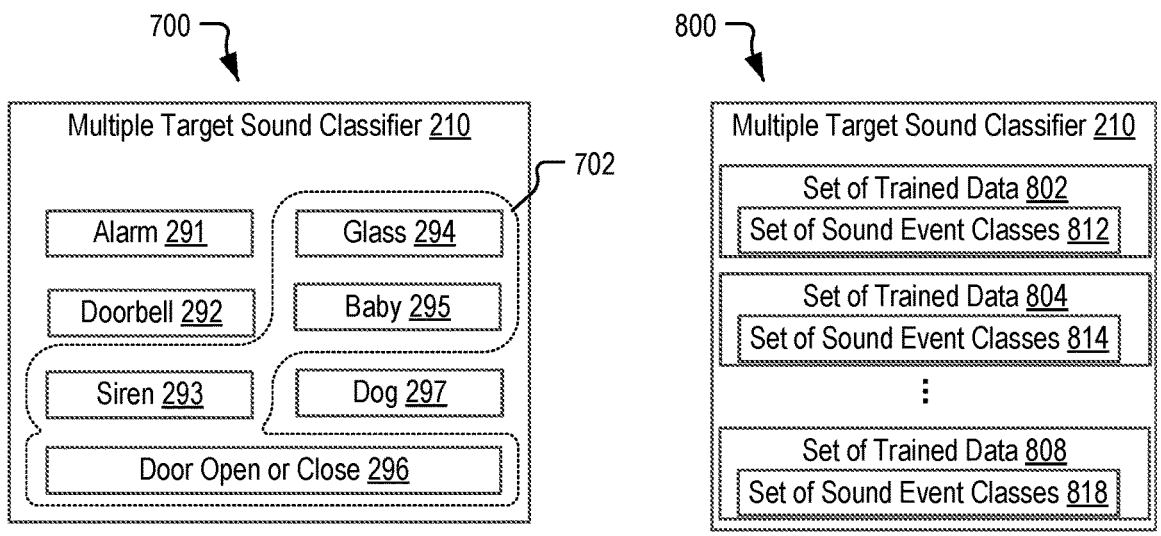
FIG. 7
FIG. 8

US 12,437,777 B2

METHOD AND APPARATUS FOR TARGET SOUND DETECTION

I. CROSS-REFERENCE TO RELATED APPLICATION(S)

The present application claims priority from and is a continuation application of U.S. patent application Ser. No. 16/837,420, filed Apr. 1, 2020, and entitled "METHOD AND APPARATUS FOR TARGET SOUND DETECTION," the content of which is incorporated herein by reference in its entirety.

II. FIELD

The present disclosure is generally related to detection of target sounds in audio data.

III. DESCRIPTION OF RELATED ART

Audio context detection is conventionally used to enable an electronic device to identify contextual information based on audio captured by the electronic device. For example, an electronic device may analyze received sound to determine whether the sound is indicative of a predetermined sound event. As another example, the electronic device may analyze the received sound to classify the surrounding environment, such as a home environment or an office environment. An "always-on" audio context detection system enables the electronic device to continually scan audio input to detect sound events in the audio input. However, continual operation of the audio context detection system results in relatively large power consumption, which reduces battery life when implemented in a mobile device. In addition, system complexity and power consumption increase with an increased number of sound events that the audio context detection system is configured to detect.

IV. SUMMARY

According to one implementation of the present disclosure, a device to perform sound detection includes one or more processors. The one or more processors include a buffer configured to store audio data. The one or more buffers also include a target sound detector that includes a first stage and a second stage. The first stage includes a binary target sound classifier configured to process the audio data. The first stage is configured to activate the second stage in response to detection of a target sound by the first stage. The second stage is configured to receive the audio data from the buffer in response to the detection of the target sound.

According to another implementation of the present disclosure, a method of target sound detection includes storing audio data in a buffer. The method also includes processing the audio data in the buffer using a binary target sound classifier in a first stage of a target sound detector and activating a second stage of the target sound detector in response to detection of a target sound by the first stage. The method further includes processing the audio data from the buffer using a multiple target sound classifier in the second stage.

According to another implementation of the present disclosure, a computer-readable storage device stores instructions that, when executed by one or more processors, cause the one or more processors to store audio data in a buffer and to process the audio data in the buffer using a binary target sound classifier in a first stage of a target sound detector. The instructions, when executed by the one or more processors, also cause the one or more processors to activate a second stage of the target sound detector in response to detection of a target sound by the first stage and to process the audio data from the buffer using a multiple target sound classifier in the second stage.

According to another implementation of the present disclosure, an apparatus includes means for detecting a target sound. The means for detecting the target sound includes a first stage and a second stage. The first stage includes means for generating a binary target sound classification of audio data and for activating the second stage in response to classifying the audio data as including the target sound. The apparatus also includes means for buffering the audio data and for providing the audio data to the second stage in response to the classification of the audio data as including the target sound.

V. BRIEF DESCRIPTION OF THE DRAWINGS

FIG. 6 is a diagram of another particular implementation of the device of FIG. 1 including scene detector, in accordance with some examples of the present disclosure.

FIG. 7 is a diagram of a particular example of components that may be incorporated in the device of FIG. 6, in accordance with some examples of the present disclosure.

FIG. 8 is a diagram of another particular example of components that may be incorporated the device of FIG. 6, in accordance with some examples of the present disclosure.

VI. DETAILED DESCRIPTION

Figure 1:
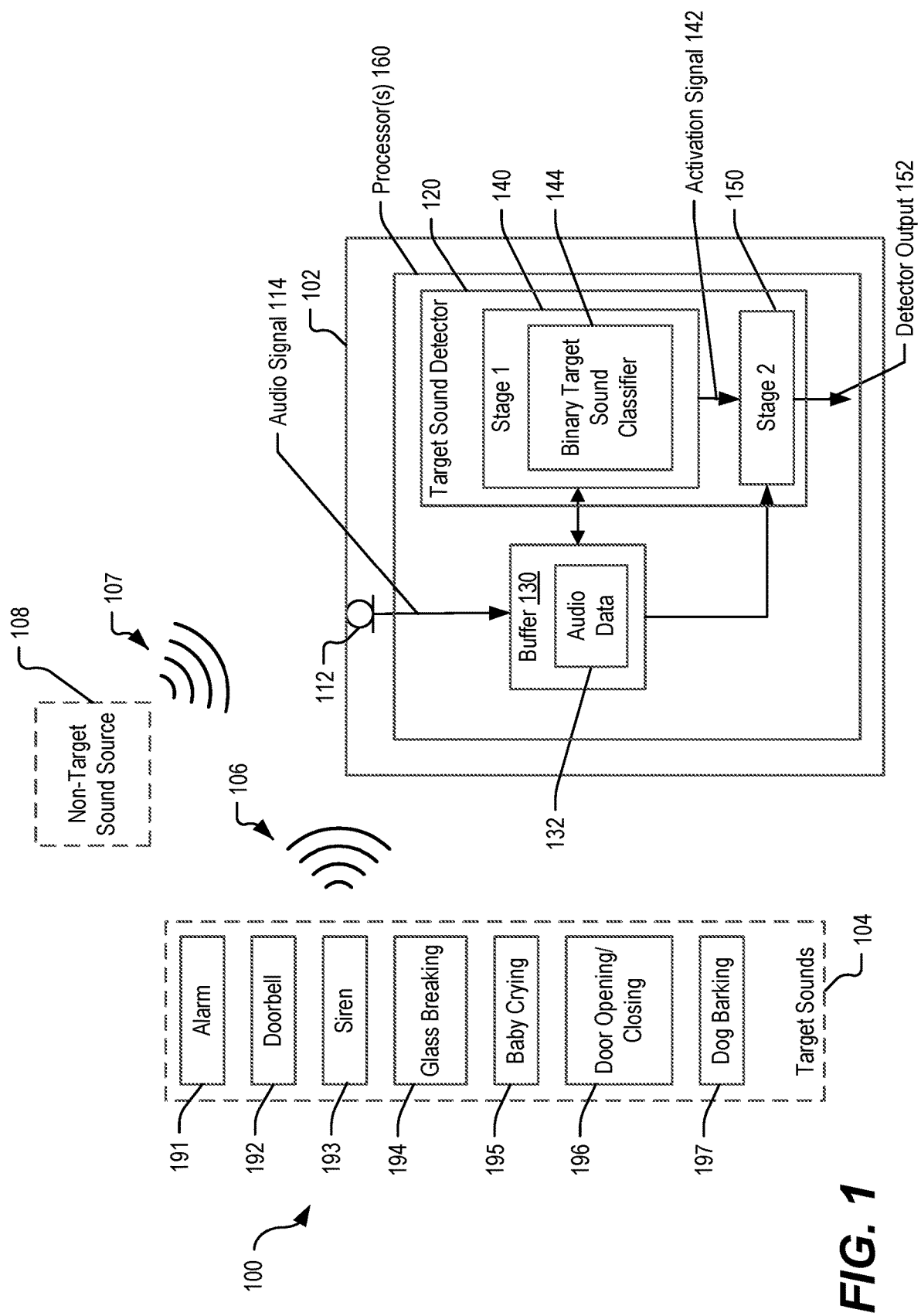
FIG. 1 is a diagram of a particular illustrative implementation of a system including a device including a multi-stage target sound detector, in accordance with some examples of the present disclosure.

Devices and methods that use a multi-stage target sound detector to reduce power consumption are disclosed. Because an always-on sound detection system that continually scans audio input to detect audio events in the audio input results in relatively large power consumption, battery life is reduced when the always-on sound detection system is implemented in a power-constrained environment, such as in a mobile device. Although power consumption can be reduced by reducing the number of audio events that the sound detection system is configured to detect, reducing the number of audio events reduces the utility of the sound detection system.

As described herein, a multi-stage target sound detector supports detection of a relatively large number of target sounds of interest using relatively low power for always-on operation. The multi-stage target sound detector includes a first stage that supports binary classification of audio data between all target sounds of interest (as a group) and non-target sounds. The multi-stage target sound detector includes a second stage to perform further analysis and to categorize the audio data as including a particular one or more of the target sounds of interest. The binary classification of the first stage enables low power consumption due to low complexity and small memory footprint to support sound event detection in an always-on operating state. The second stage includes a more powerful target sound classifier to distinguish between target sounds and to reduce or eliminate false positives (e.g., inaccurate detections of target sound) that may be generated by the first stage.

In some implementations, in response to detecting that one or more of the target sounds of interest in the audio data, the second stage is activated (e.g., from a sleep state) to enable more powerful processing of the audio data. Upon completion of processing the audio data at the second stage, the second stage may return to a low-power state. By using the low-complexity binary classification of the first stage for always-on operation and selectively activating the more powerful target sound classifier of the second stage, the target sound detector enables high-performance target sound classification with reduced average power consumption for always-on operation.

In some implementations, a multiple-stage environmental scene detector includes an always-on first stage that detects whether or not an environmental scene change has occurred and also includes a more powerful second stage that is selectively activated when the first stage detects a change in the environment. In some examples, the first stage includes a binary classifier configured to detect whether audio data represents an environmental scene change without identifying any particular environmental scene. In other examples, a hierarchical scene change detector includes a classifier configured to detect a relatively small number of broad classes in the first stage (e.g., indoors, outdoors, and in vehicle), and a more powerful classifier in the second stage is configured to detect a larger number of more specific environmental scenes (e.g., in a car, on a train, at home, in an office, etc.). As a result, high-performance environmental scene detection may be provided with reduced average power consumption for always-on operation in a similar manner as for the multi-stage target sound detection.

In some implementations, the target sound detector adjusts operation based on its environment. For example, when the target sound detector is in the user's house, the target sound detector may use trained data associated with household sounds, such as a dog barking or a doorbell. When the target sound detector is in a vehicle, such as a car, the target sound detector may be trained data associated with vehicle sounds, such as glass breaking or a siren. A variety of techniques can be used to determine the environment, such as using an audio scene detector, a camera, location data (e.g., from a satellite-based positioning system), or combinations of techniques. In some examples, the first stage of the target sound detector activates a camera or other component to determine the environment, and the second stage of the target sound detector is "tuned" for more accurate detection of target sounds associated with the detected environment. Using the camera or other component for environment detection enables enhanced target sound detection, and maintaining the camera or other component in a low-power state until activated by the first stage of the target sound detector enables reduced power consumption.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearby wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wireless modems, laptop computers, personal computers, etc.

FIG. 1 depicts a system 100 that includes a device 102 that is configured to receive an input sound and process the input sound with a multi-stage target sound detector 120 to detect the presence or absence of one or more target sounds in the input sound. The device 102 includes one or more microphones, represented as a microphone 112, and one or more processors 160. The one or more processors 160 include the target sound detector 120 and a buffer 130 configured to store audio data 132. The target sound detector 120 includes a first stage 140 and a second stage 150. In some implementations, the device 102 can include a wireless speaker and voice command device with an integrated assistant application (e.g., a "smart speaker" device or home automation system), a portable communication device (e.g., a "smart phone" or headset), or a vehicle system, as illustrative, non-limiting examples.

The microphone 112 is configured to generate an audio signal 114 responsive to the received input sound. For example the input sound can include target sound 106, non-target sound 107, or both. The audio signal 114 is provided to the buffer 130 and is stored as the audio data 132. In an illustrative example, the buffer 130 corresponds to a pulse-code modulation (PCM) buffer and the audio data 132 corresponds to PCM data. The audio data 132 at the buffer 130 is accessible to the first stage 140 and to the second stage 150 of the target sound detector 120 for processing, as described further herein.

The target sound detector 120 is configured to process the audio data 132 to determine whether the audio signal 114 is indicative of one or more target sounds of interest. For example, the target sound detector 120 is configured to detect each of a set of target sounds 104, including an alarm 191, a doorbell 192, a siren 193, glass breaking 194, a baby crying 195, a door opening or closing 196, and a dog barking 197, that may be in the target sound 106. It should be understood that the target sounds 191-197 included in the set of target sounds 104 are provided as illustrative examples, in other implementations, the set of target sounds 104 can include fewer, more, or different sounds. The target sound detector 120 is further configured to detect that the non-target sound 107, originating from one or more other sound sources (represented as a non-target sound source 108), does not include any of the target sounds 191-197.

The first stage 140 of the target sound detector 120 includes a binary target sound classifier 144 configured to process the audio data 132. In some implementations, the binary target sound classifier 144 includes a neural network. In some examples, the binary target sound classifier 144 includes at least one of a Bayesian classifier or a Gaussian Mixed Model (GMM) classifier, as illustrative, non-limiting examples. In some implementations, the binary target sound classifier 144 is trained to generate one of two outputs: either a first output (e.g., 1) indicating that the audio data 132 being classified contains one or more of the target sounds 191-197, or a second output (e.g., 0) indicating that the audio data 132 does not contain any of the target sounds 191-197. In an illustrative example, the binary target sound classifier 144 is not trained to distinguish between each of the target sounds 191-197, enabling a reduced processing load and smaller memory footprint.

The first stage 140 is configured to activate the second stage 150 in response to detection of a target sound. To illustrate, the binary target sound classifier 144 is configured to generate a signal 142 (also referred to as an "activation signal" 142) to activate the second stage 150 in response to detecting the presence of any of the multiple target sounds 104 in the audio data 132 and to refrain from generating the signal 142 in response to detecting that none of the multiple target sounds 104 are in the audio data 132. In a particular aspect, the signal 142 is a binary signal including a first value (e.g., the first output) and a second value (e.g., the second output, and generating the signal 142 corresponds to generating the binary signal having the first value (e.g., a logical 1). In this aspect, refraining from generating the signal 142 corresponds to generating the binary signal having the second value (e.g., a logical 0).

Figure 2:
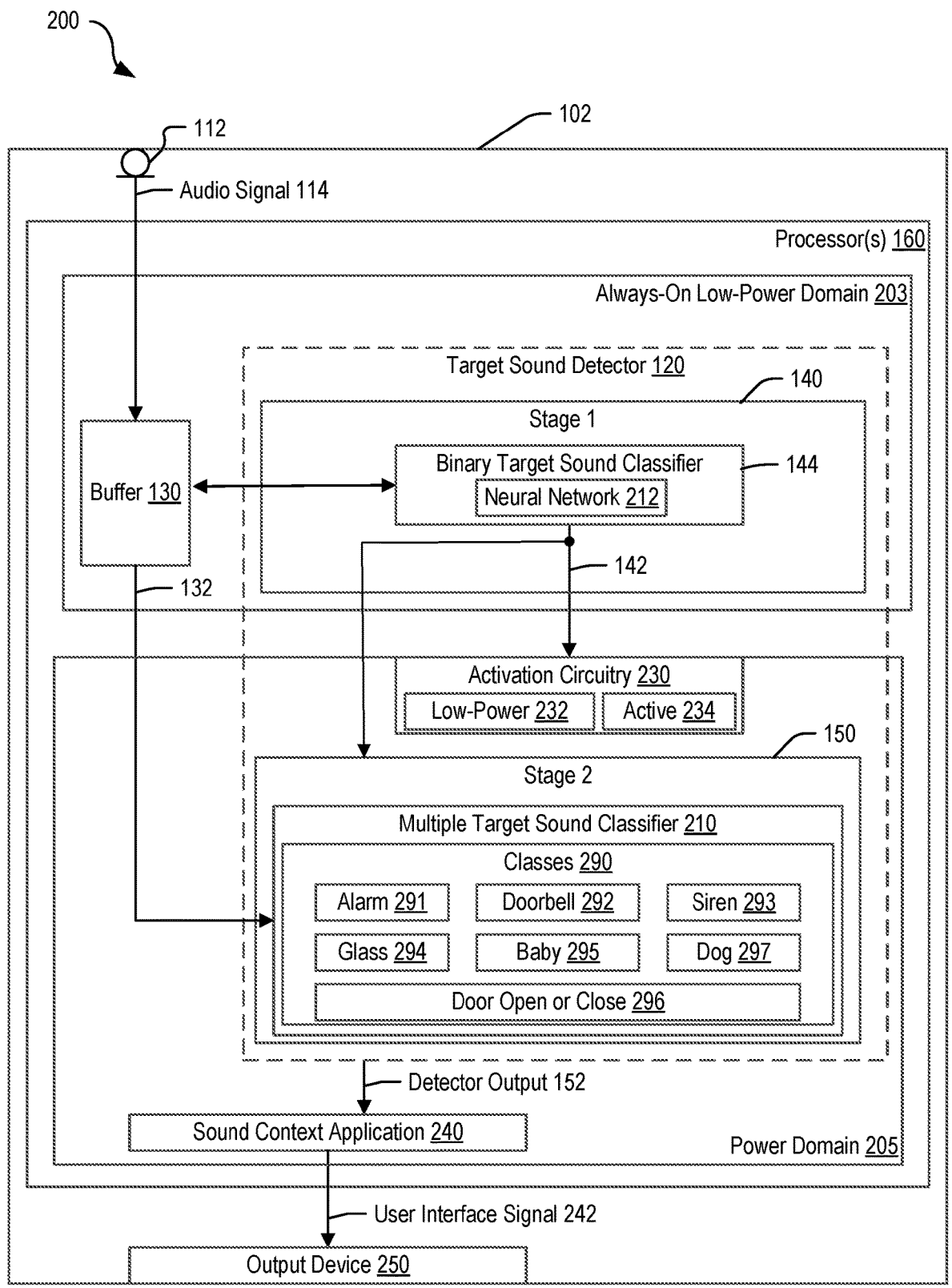
FIG. 2 is a diagram of a particular implementation of the device of FIG. 1, in accordance with some examples of the present disclosure.

In some implementations, the second stage 150 is configured to be activated, responsive to the signal 142, to process the audio data 132, such as described further with reference to FIG. 2. In an illustrative example, a specific bit of a control register represents the presence or absence of the activation signal 142 and a control circuit within or coupled to the second stage 150 is configured to read the specific bit. A "1" value of the bit indicates the signal 142 and causes the second stage 150 to activate, and a "0" value of the bit indicates absence of the signal 142 and that the second stage 150 can de-activate upon completion of processing a current portion of the audio data 132. In other implementations, the activation signal 142 is instead implemented as a digital or analog signal on a bus or a control line, an interrupt flag at an interrupt controller, or an optical or mechanical signal, as illustrative, non-limiting examples.

The second stage 150 is configured to receive the audio data 132 from the buffer 130 in response to the detection of the target sound 106. In an example, the second stage 150 is configured to process one or more portions (e.g., frames) of the audio data 132 that include the target sound 106. For example, the buffer 130 can buffer a series of frames of the audio signal 114 as the audio data 132 so that, upon the activation signal 142 being generated, the second stage 150 can process the buffered series of frames and generate a detector output 152 that indicates, for each of the multiple target sounds 104, the presence or absence of that target sound in the audio data 132.

When deactivated, the second stage 150 does not process the audio data 132 and consumes less power than when activated. For example, deactivation of the second stage 150 can include gating an input buffer to the second stage 150 to prevent the audio data 132 from being input to the second stage 150, gating a clock signal to prevent circuit switching within the second stage 150, or both, to reduce dynamic power consumption. As another example, deactivation of the second stage 150 can include reducing a power supply to the second stage 150 to reduce static power consumption without losing the state of the circuit elements, removing power from at least a portion of the second stage 150, or a combination thereof.

In some implementations, the target sound detector 120, the buffer 130, the first stage 140, the second stage 150, or any combination thereof, are implemented using dedicated circuitry or hardware. In some implementations, the target sound detector 120, the buffer 130, the first stage 140, the second stage 150, or any combination thereof, are implemented via execution of firmware or software. To illustrate, the device 102 can include a memory configured to store instructions and the one or more processors 160 are configured to execute the instructions to implement one or more of the target sound detector 120, the buffer 130, the first stage 140, and the second stage 150.

Because the processing operations of the binary target sound classifier 144 are less complex as compared to the processing operations performed by the second stage 150, always-on processing of the audio data 132 at the first stage 140 uses significantly less power than processing the audio data 132 at the second stage 150. As a result, processing resources are conserved, and overall power consumption is reduced.

In some implementations, the first stage 140 is also configured to activate one or more other components of the device 102. In an illustrative example, the first stage 140 activates a camera that is used to detect an environment of the device 102 (e.g., at home, outdoors, in a car, etc.), and the second stage 150 may be operated to focus on target sounds associated with the detected environment, such as described further with reference to FIG. 6.

FIG. 2 depicts an example 200 of the device 102 in which the binary target sound classifier 144 includes a neural network 212, and the binary target sound classifier 144 and the buffer 130 are included in a low-power domain 203, such as an always-on low power domain of the one or more processors 160. The second stage 150 is in another power domain 205, such as an on-demand power domain. In some implementations, the first stage 140 of the target sound detector 120 (e.g., the binary target sound classifier 144) and the buffer 130 are configured to operate in an always-on mode, and the second stage 150 of the target sound detector 120 is configured to operate in an on-demand mode.

The power domain 205 includes the second stage 150 of the target sound detector 102, a sound context application 240, and activation circuitry 230. The activation circuitry 230 is responsive to the activation signal 142 (e.g., a wakeup interrupt signal) to selectively activate one or more components of the power domain 205, such as the second stage 150. To illustrate, in some implementations, the activation circuitry 230 is configured to transition the second stage 150 from a low-power state 232 to an active state 234 responsive to receiving the signal 142.

For example, the activation circuitry 230 may include or be coupled to power management circuitry, clock circuitry, head switch or foot switch circuitry, buffer control circuitry, or any combination thereof. The activation circuitry 230 may be configured to initiate powering-on of the second stage 150, such as by selectively applying or raising a voltage of a power supply of the second stage 150, of the power domain 205, or both. As another example, the activation circuitry 230 may be configured to selectively gate or un-gate a clock signal to the second stage 150, such as to prevent circuit operation without removing a power supply.

The second stage 150 includes a multiple target sound classifier 210 configured to generate a detector output 152 that indicates, for each of the multiple target sounds 104, the presence or absence of that target sound in the audio data 132. The multiple target sounds correspond to multiple classes 290 of sound events, the multiple classes 290 of sound events including at least two of: alarm 291, doorbell 292, siren 293, glass breaking 294, baby crying 295, door opening or closing 296, or dog barking 297. It should be understood that the sound event classes 291-297 are provided as illustrative examples. In other examples, the multiple classes 290 includes fewer, more, or different sound events. For example, in an implementation in which the device 102 is implemented in a vehicle (e.g., a car), the multiple classes 290 include sound events more commonly encountered in a vehicle, such as one or more of a vehicle door opening or closing, road noise, window opening or closing, radio, braking, hand brake engaging or disengaging, windshield wipers, turn signal, or engine revving, as illustrative, non-limiting examples. Although a single set of sound event classes (e.g., the multiple classes 290) is depicted, in other implementations the multiple target sound classifier 210 is configured to select from between multiple sets of sound event classes based on the environment of the device 102 (e.g., one set of target sounds when the device 102 is at home, and another set of target sounds when the device 102 is in a vehicle), as described further with reference to FIG. 6.

In some implementations, the multiple target sound classifier 210 performs "faster than real-time" processing of the audio data 132. In an illustrative, non-limiting example, the buffer 130 is sized to store approximately two seconds of audio data in a circular buffer configuration in which the oldest audio data in the buffer 130 is replaced by the most recently received audio data. The first stage 140 may be configured to periodically process sequentially received, 20 millisecond (mS) segments (e.g., frames) of the audio data 132 in a real-time manner (e.g., the binary target sound classifier 144 processes one 20 mS segment every 20 mS) and with low power consumption. However, when the second stage 150 is activated, the multiple target sound classifier 210 processes the buffered audio data 132 at a faster rate and higher power consumption to more quickly process the buffered audio data 132 to generate the detector output 152.

In some implementations, the detector output 152 includes multiple values, such as a bit or multi-bit value for each target sound, indicating detection (or likelihood of detection) of that target sound. In an illustrative example, the detector output 152 includes a seven-bit value, with a first bit corresponding to detection or non-detection of sound classified as an alarm 291, a second bit corresponding to detection or non-detection of sound classified as a doorbell 292, a third bit corresponding to detection or non-detection of sound classified as a siren 293, a fourth bit corresponding to detection or non-detection of sound classified as glass breaking 294, a fifth bit corresponding to detection or non-detection of sound classified as a baby crying 295, a sixth bit corresponding to detection or non-detection of sound classified as a door opening or closing 296, and a seventh bit corresponding to detection or non-detection of sound classified as a dog barking 297.

The detector output 152 generated by the second stage 150 is provided to a sound context application 240. The sound context application 240 may be configured to perform one or more operations based on the detection of one or more target sounds. To illustrate, in an implementation in which the device 102 is in a home automation system, the sound context application 240 may generate a user interface signal 242 to alert a user of one or more detected sound events. For example, the user interface signal 242 may cause an output device 250 (e.g., a display screen or a loudspeaker of a speech interface device) to alert the user that a barking dog and breaking glass have been detected at a back door of the building. In another example, when the user is not within the building, the user interface signal 242 may cause the output device 250 (e.g., a transmitter coupled to a wireless network, such as a cellular network or wireless local area network) to transmit the alert to the user's phone or smart watch.

In another implementation in which the device 102 is in a vehicle (e.g., an automobile), the sound context application 240 may generate the user interface signal 242 to warn an operator of the vehicle, via the output device 250 (e.g., a display screen or voice interface), that a siren has been detected via an external microphone while the vehicle is in motion. If the vehicle is turned off and the operator has exited the vehicle, the sound context application 240 may generate the user interface signal 242 to warn an owner of the vehicle, via the output device 250 (e.g., wireless transmission to the owner's phone or smart watch), that a crying baby has been detected via an interior microphone of the vehicle.

In another implementation in which the device 102 is integrated in or coupled to an audio playback device, such as headphones or a headset, the sound context application 240 may generate the user interface signal 242 to warn a user of the playback device, via the output device 250 (e.g., a display screen or loudspeaker), that a siren has been detected, or may pass-though the siren for playback at a loudspeaker of the headphones or headset, as illustrative examples.

Although the activation circuitry 230 is illustrated as distinct from the second stage 150 in the power domain 205, in other implementations the activation circuitry 230 can be included in the second stage 150. Although in some implementations the output device 250 is implemented as a user interface component of the device 102, such as a display screen or a loudspeaker, in other implementations the output device 250 can be a user interface device that is remote from and coupled to the device 102. Although the multiple target sound classifier 210 is configured to detect and distinguish between sound events corresponding to the seven classes 291-297, in other implementations the multiple target sound classifier 210 can be configured to detect any other sound event in place of, or in addition to, any one or more of the seven classes 291-297, and the multiple target sound classifier 210 can be configured to classify sound events according to any other number of classes.

Figure 3:
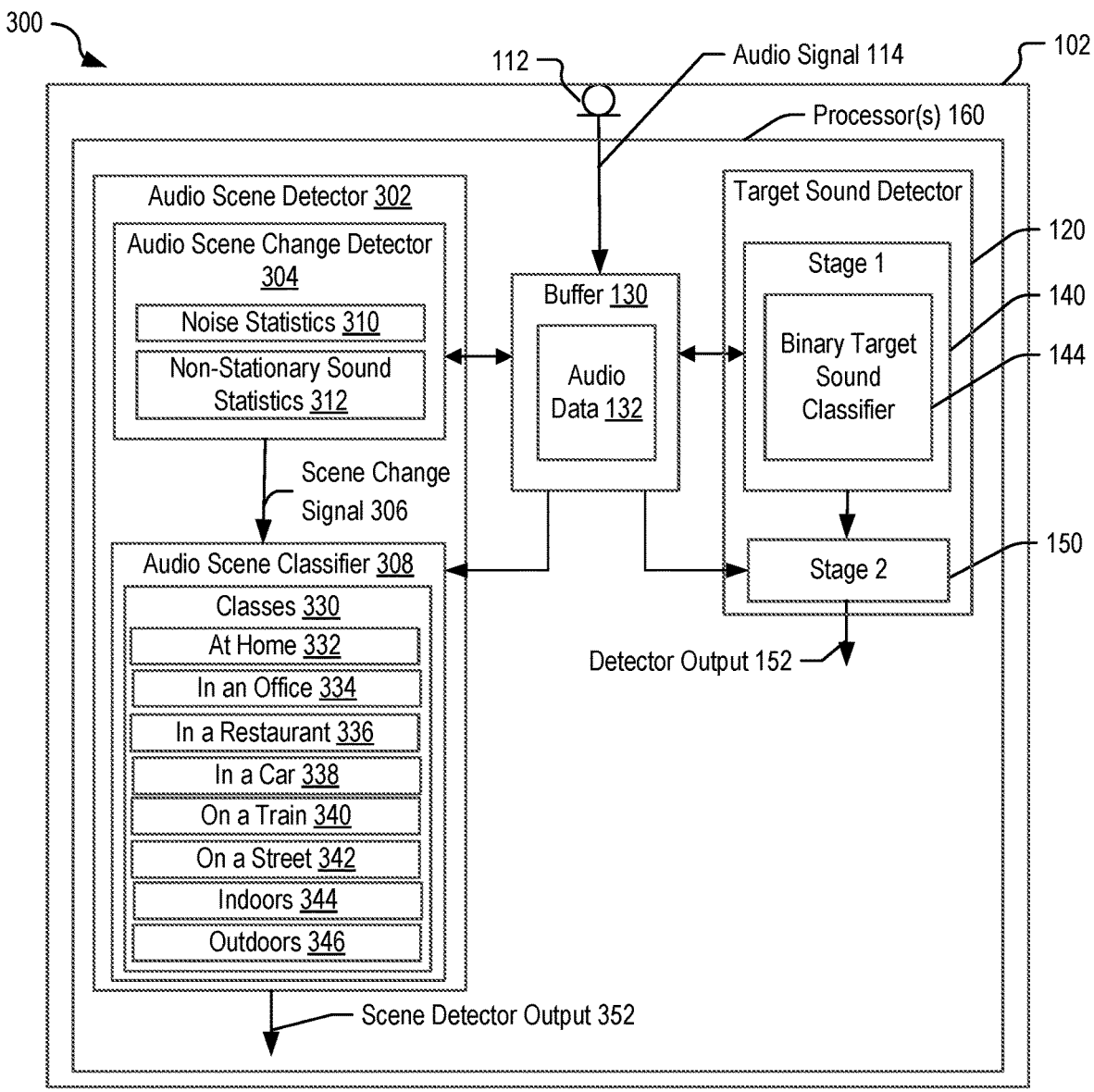
FIG. 3 is a diagram of another particular implementation of the device of FIG. 1 including a multi-stage audio scene detector, in accordance with some examples of the present disclosure.

FIG. 3 depicts an implementation 300 in which the device 102 includes the buffer 130 and the target sound detector 120 and also includes an audio scene detector 302. The audio scene detector 302 includes an audio scene change detector 304 and an audio scene classifier 308. The audio scene change detector 304 is configured to process the audio data 132 and to generate a scene change signal 306 in response to detection of an audio scene change. In some implementations, the audio scene change detector 304 is implemented in a first stage of the audio scene detector 302 (e.g., a low-power, always-on processing stage) and the audio scene classifier 308 is implemented in a second stage of the audio scene detector 302 (e.g., a more powerful, high-performance processing stage) that is activated by the scene change signal 306 in a similar manner as the multiple target sound classifier 210 of FIG. 2 is activated by the activation signal 142. Unlike target sound detection, an audio environment is always present, and efficiency of operation of the audio scene detector 302 is enhanced in the first stage by detecting changes in the audio environment without incurring the computational penalty associated with identifying the exact audio environment.

In some implementations, the audio scene change detector 304 is configured to detect a change in an audio scene based on detecting changes in at least one of noise statistics 310 or non-stationary sound statistics 312. As an example, the audio scene change detector 304 processes the audio data 132 to determine the noise statistics 310 (e.g., an average spectral energy distribution of audio frames that are identified as containing noise) and the non-stationary sound statistics 312 (e.g., an average spectral energy distribution of audio frames that are identified as containing non-stationary sound), time-averaged over a relatively large time window (e.g., 3-5 seconds). Changes between audio scenes are detected based on determining a change in the noise statistics 310, the non-stationary sound statistics 312, or both. For example, noise and sound characteristics of an office environment are sufficiently distinct from the noise and sound characteristics within a moving automobile that a change from the office environment to the vehicle environment can be detected, and in some implementations the change is detected without identifying the noise and sound characteristics as corresponding to either of the office environment or the vehicle environment. In response to detecting an audio scene change, the audio scene change detector generates and sends the scene change signal 306 to the audio scene classifier 308.

The audio scene classifier 308 is configured to receive the audio data 132 from the buffer 130 in response to the detection of the audio scene change. In some implementations, the audio scene classifier 308 is a more powerful, higher-complexity processing component than the audio scene change detector 304 and is configured to classify the audio data 132 as corresponding to a particular one of multiple audio scene classes 330. In one example, the multiple audio scene classes 330 include at home 332, in an office 334, in a restaurant 336, in a car 338, on a train 340, on a street 342, indoors 344, and outdoors 346.

A scene detector output 352 is generated by the audio scene detector 302 and presents an indication of the detected audio scene, which may be provided to the sound context application 240 of FIG. 2. For example, the sound context application 240 can adjust operation of the device 102 based on the detected audio scene, such as changing a graphical user interface (GUI) at a display screen to present top-level menu items associated with the environment. To illustrate, navigation and communication items (e.g., hands-free dialing) may be presented when the detected environment is in a car, camera and audio recording items may be presented when the detected environment is outdoors, and note-taking and contacts items may be presented when the detected environment is in an office, as illustrative, non-limiting examples.

Although the multiple audio scene classes 330 are described as including eight classes 332-346, in other implementations the multiple audio scene classes 330 may include at least two of at home 332, in an office 334, in a restaurant 336, in a car 338, on a train 340, on a street 342, indoors 344, or outdoors 346. In other implementations, one or more of the classes 330 may be omitted, one or more other classes may be used in place of, or in addition to, the classes 332-346, or any combination thereof.

Figure 4:
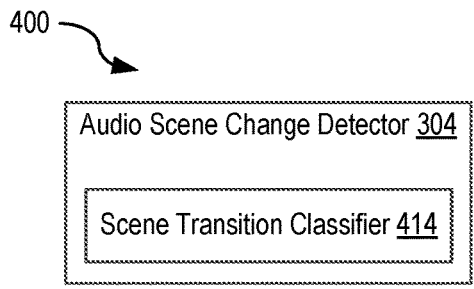
FIG. 4 is a diagram of a particular example of components that may be incorporated a multi-stage audio scene detector, in accordance with some examples of the present disclosure.

FIG. 4 depicts an implementation 400 of the audio scene change detector 304 in which the audio scene change detector 304 includes a scene transition classifier 414 that is trained using audio data corresponding to transitions between scenes. For example, the scene transition classifier 414 can be trained on captured audio data for office-to-street transitions, car-to-outdoor transitions, restaurant-to-street transitions, etc. In some implementations, the scene transition classifier 414 provides more robust change detection using a smaller model than the implementation of the audio scene change detector 304 described with reference to FIG. 3.

Figure 5:
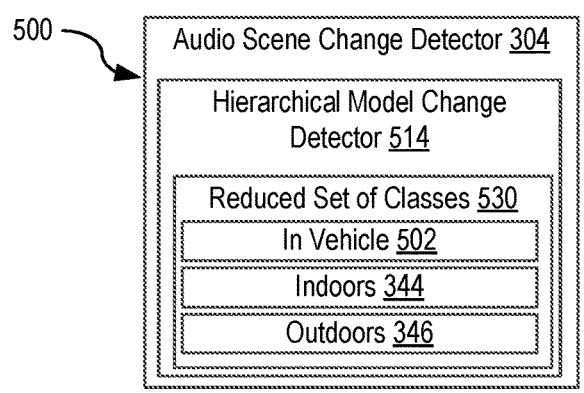
FIG. 5 is a diagram of another particular example of components that may be incorporated a multi-stage audio scene detector, in accordance with some examples of the present disclosure.

FIG. 5 depicts an implementation 500 in which audio scene detector 302 corresponds to a hierarchical detector such that the audio scene change detector 304 classifies the audio data 132 using a reduced set of audio scenes as compared to the audio scene classifier 308. To illustrate, the audio scene change detector 304 includes a hierarchical model change detector 514 that is configured to detect the audio scene change based on detecting changes between audio scene classes of a reduced set of classes 530. For example, the reduced set of classes 530 includes an "In Vehicle" class 502, the indoors class 344, and the outdoors class 346. In some implementations, one or more (or all) of the reduced set of classes 530 includes or spans multiple classes used by the audio scene classifier 308. To illustrate, the "In Vehicle" class 502 is used to classify audio scenes that the audio scene classifier 308 distinguishes as either "in a car" or "on a train." In some implementations, one or more (or all) of the reduced set of classes 530 form a subset of the classes 330 used by the audio scene classifier 308, such as the indoors class 344 and the outdoors class 346. In some examples, the reduced set of classes 530 is configured to include two or three of the most likely encountered audio scenes for improved probability of detecting audio scene changes.

The reduced set of classes 530 includes a reduced number of classes as compared to the classes 330 of the audio scene classifier 308. To illustrate, a first count of the audio scene classes of the reduced set of classes 530 (three) is less than a second count of the audio scene classes 330 (eight). Although the reduced set of classes 530 is described as including three classes, in other implementations the reduced set of classes 530 may include any number of classes (e.g., at least two classes, such as two, three, four, or more classes) that is fewer than the number of classes supported by the audio scene classifier 308.

Because the hierarchical model change detector 514 performs detection from among a smaller set of classes as compared to the audio scene classifier 308, the audio scene change detector 304 can detect scene changes with reduced complexity and power consumption as compared to the more powerful audio scene classifier 308. Transitions between environments that are not detected by the hierarchical model change detector 514 may be unlikely to occur, such as transitioning directly from "at home" to "in a restaurant" (e.g., both in the "indoors" class 344) without an intervening transition to a vehicle or an outdoors environment.

Although FIGS. 3-5 correspond to various implementations in which the audio scene detector 304 and the target sound detector 120 are both included in the device 102, in other implementations the audio scene detector 302 can be implemented in a device that does not include a target sound detector. In an illustrative example, the device 102 includes the buffer 130 and the audio scene detector 302 and omits the first stage 140, the second stage 150, or both, of the target sound detector 120.

FIG. 6 depicts a particular example 600 in which the device 102 includes a scene detector 606 configured to detect an environment based on at least one of a camera, a location detection system, or an audio scene detector.

The device 102 includes one or more sensors 602 that generate data usable by the scene detector 606 in determining the environment 608. The one or more sensors 602 include one or more cameras and one or more sensors of a location detection system, illustrated as a camera 620 and a global positioning system (GPS) receiver 624, respectively. The camera 620 can include any type of image capture device and can support or include still image or video capture, visible, infrared, or ultraviolet spectrums, depth sensing (e.g., structured light, time-of-flight), any other image capture technique, or any combination thereof.

The first stage 140 is configured to activate one or more of the sensors 602 from a low-power state in response to the detection of a target sound by the first stage 140. For example, the signal 142 can be provided to the camera 620 and to the GPS receiver 624. The camera 620 and the GPS receiver 624 are responsive to the signal 142 to transition from a low-power state (e.g., when not in use by another application of the device 102) to an active state.

The scene detector 606 includes the audio scene detector 302 and is configured to detect the environment 608 based on at least one of the camera 620, the GPS receiver 624, or the audio scene detector 302. As a first example, the scene detector 606 is configured to generate a first estimate of the environment 608 of the device 102 at least partially based on an input signal 622 (e.g., image data) from the camera 624. To illustrate, the scene detector 606 may be configured to process the input data 622 to generate a first classification of the environment 608, such as at home, in an office, in a restaurant, in a car, on a train, on a street, outdoors, or indoors, based on visual features.

As a second example, the scene detector 606 is configured to generate a second estimate of the environment 608 at least partially based on location information 626 from the GPS receiver. To illustrate, the scene detector 606 may search map data using the location information 626 to determine whether the location corresponds to a user's home, the user's office, a restaurant, a train route, a street, an outdoor location, or an indoor location. The scene detector 606 may be configured to determine a speed of travel of the device 102 based on the location data 626 to determine whether the device 102 is traveling in a car or airplane.

In some implementations, the scene detector 606 is configured to determine the environment 608 based on the first estimate, the second estimate, the scene detector output 352 of the audio scene detector 302, and respective confidence levels associated with the first estimate, the second estimate, and the scene detector output 352. An indication of the environment 608 is provided to the target sound detector 120, and operation of the multiple target sound classifier 210 is at least partially based on the classification of the environment 608 by the scene detector 606.

Although FIG. 6 depicts the device 102 including the camera 620, the GPS receiver 624, and the audio scene detector 302, in other implementations one or more of the camera 620, the GPS receiver 624, or the audio scene detector 302 is omitted, one or more other sensors is added, or any combination thereof. For example, the audio scene detector 302 may be omitted or replaced with one or more other audio scene detectors. In other examples, the scene detector 606 determines the environment 608 solely based on the image data 622 from the camera, solely based on the location data 62 from the GPS sensor 624, or solely based on a scene detection from an audio scene detector.

Although the one or more sensors 602, the audio scene detector 302, and the scene detector 606 are activated responsive to the signal 142, in other implementations the scene detector 606, the audio scene detector 302, one or more of the sensors 602, or any combination thereof, may be activated or deactivated independently of the signal 142. As a non-limiting example, in a non-power-constrained environment, such as in a vehicle or a home appliance, the one or more sensors 602, the audio scene detector 302, and the scene detector 606 may maintain an active state even though no target sound activity is detected.

FIG. 7 depicts an example 700 in which the multiple target sound classifier 210 is adjusted to focus on one or more particular classes 702, of the multiple classes 290 of sound events, that correspond to the environment 608. In the example 700, the environment 608 is detected as "in a car," and the multiple target sound classifier 210 is adjusted to give more focus to identifying target sound in the audio data 132 as one of the classes of the multiple classes 290 that are more commonly encountered in a car: siren 293, breaking glass 294, baby crying 295, or door opening or closing 296, and to give less focus to identifying target sound as one of the classes less commonly encountered in a car: alarm 291, doorbell 292, or dog barking 297. As a result, target sound detection can be performed more accurately than in implementations in which no environmental information is used to focus the target sound detection.

FIG. 8 depicts an example 800 in which the multiple target sound classifier 210 is configured to select a particular set of sound event classes that correspond to the environment 608 from among multiple sets of sound event classes. A first set of trained data 802 includes a first set of sound event classes 812 associated with a first environment (e.g., at home). A second set of trained data 804 includes a second set of sound event classes 814 associated with a second environment (e.g., in a car), and one or more additional sets of trained data including an Nth set of trained data 808 that includes an Nth set of sound event classes 818 associated with an Nth environment (e.g., in an office), where N is an integer greater than one. In a non-limiting example, each of the sets of trained data 802-808 corresponds to one of the classes 330 (e.g., N=8). In some implementations, one or more of the sets of trained data 802-808 corresponds to a default set of trained data to be used when the environment is undetermined. As an example, as the multiple classes 290 of FIG. 2 may be used as a default set of trained data.

In an illustrative implementation, the first set of sound event classes 812 corresponds to "at home" and the second set of sound event classes 814 corresponds to "in a car." The first set of sound event classes 812 includes sound events more commonly encountered in a home, such as one or more of a fire alarm, a baby crying, a dog barking, a doorbell, a door opening or closing, and breaking glass, as illustrative, non-limiting examples. The second set of event classes 814 includes sound events more commonly encountered in a car, such as one or more of a car door opening or closing, road noise, window opening or closing, radio, braking, hand brake engaging or disengaging, windshield wipers, turn signal, or engine revving, as illustrative, non-limiting examples. In response to the environment 608 being detected as "at home," the multiple target sound classifier 210 selects the first set of sound event classes 812 to classify the audio data 132 based on the sound event classes of that particular set (i.e., the first set of sound event classes 812). In response to the environment 608 being detected as "in a car," the multiple target sound classifier 210 selects the second set of sound event classes 814 to classify the audio data 132 based on the sound event classes of that particular set (i.e., the second set of sound event classes 814).

As a result, a larger overall number of target sounds can be detected by using different sets of sound events for each environment, without increasing an overall processing and memory usage for performing target sound classification for any particular environment. In addition, by using the first stage 140 to activate the sensors 602, the scene detector 606, or both, power consumption is reduced as compared to always-on operation of the sensors 602 and the scene detector 606.

Although the example 800 describes the multiple target sound classifier 210 as selecting one of the sets of sound event classes 812-818 based on the environment 608, in some implementations each of the sets of trained data 802-808 also includes trained data for the binary target sound classifier 144 to detect the presence or absence, as a group, of the target sounds that are associated with a particular environment. In an example, the target sound detector 120 is configured to select, from among the sets of trained data 802-808, a particular set of trained data that corresponds to the detected environment 608 of the device 102, and to process the audio data 132 based on the particular set of trained data.

Figure 9:
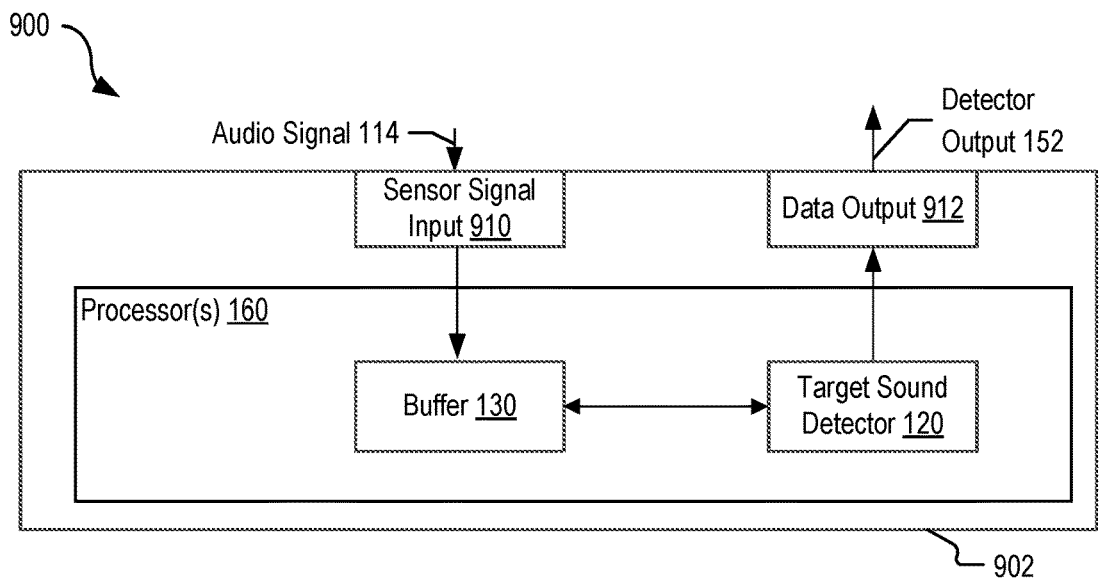
FIG. 9 illustrates an example of an integrated circuit that includes a multi-stage target sound detector, in accordance with some examples of the present disclosure.
Figure 13:
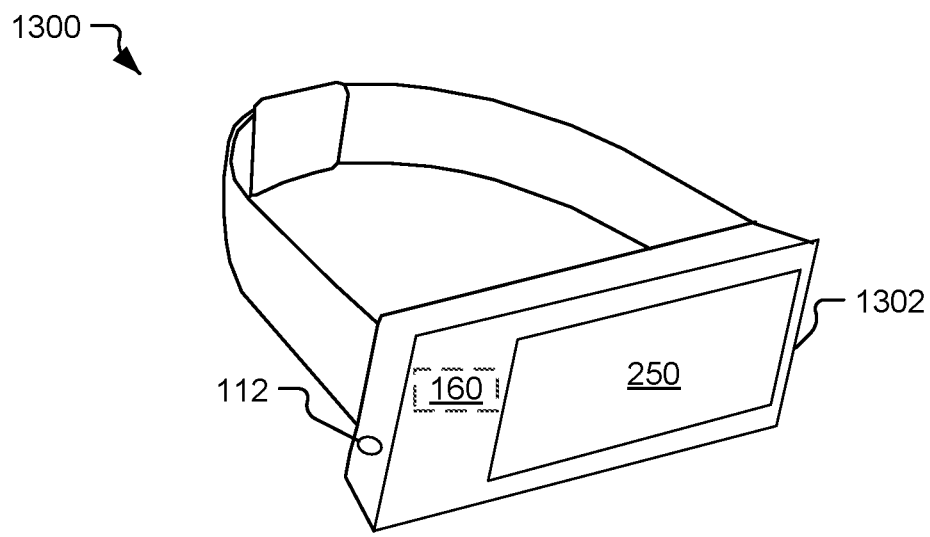
FIG. 13 is a diagram of a wearable electronic device that includes a multi-stage target sound detector, in accordance with some examples of the present disclosure.
Figure 14:
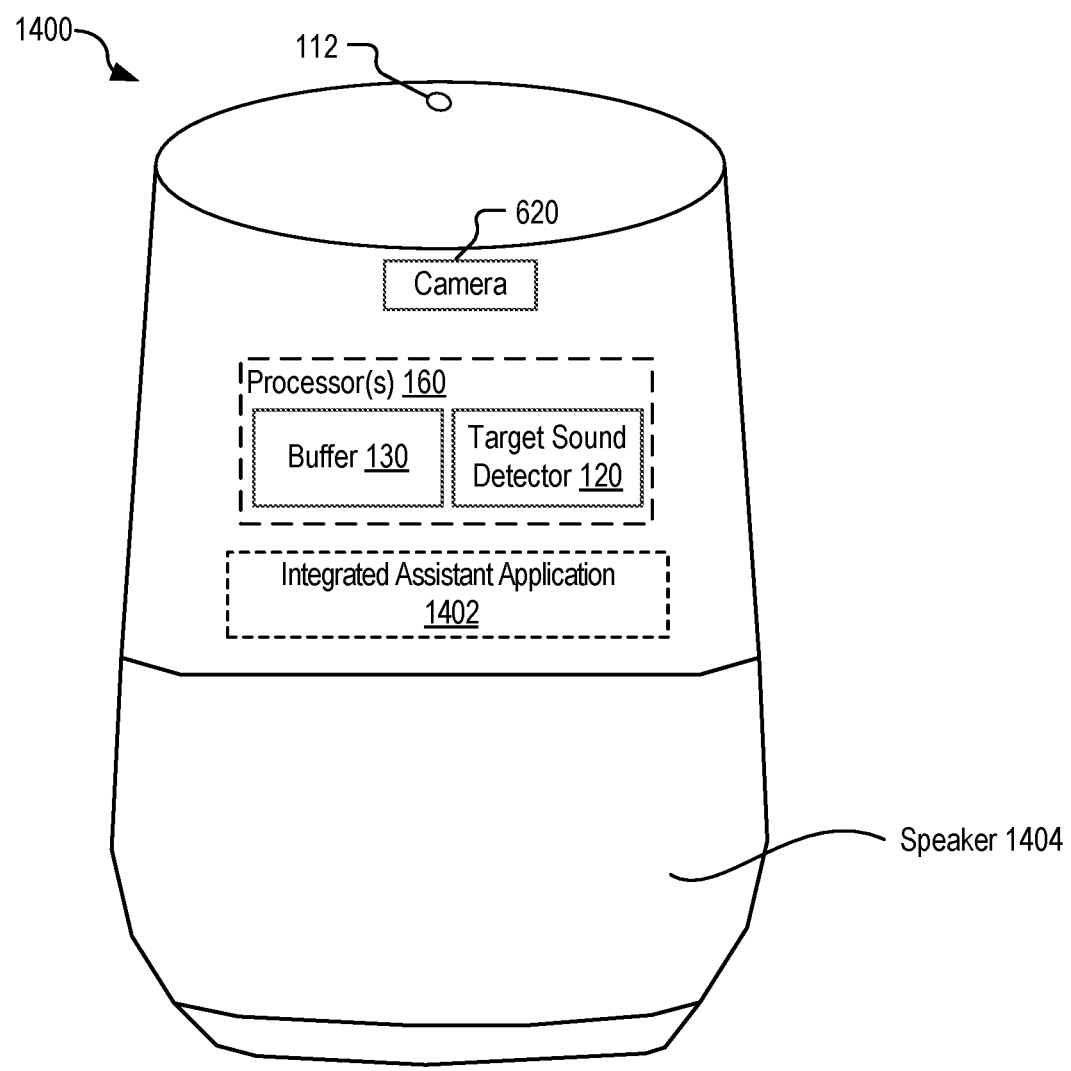
FIG. 14 is a diagram of a voice-controlled speaker system that includes a multi-stage target sound detector, in accordance with some examples of the present disclosure.
Figure 16:
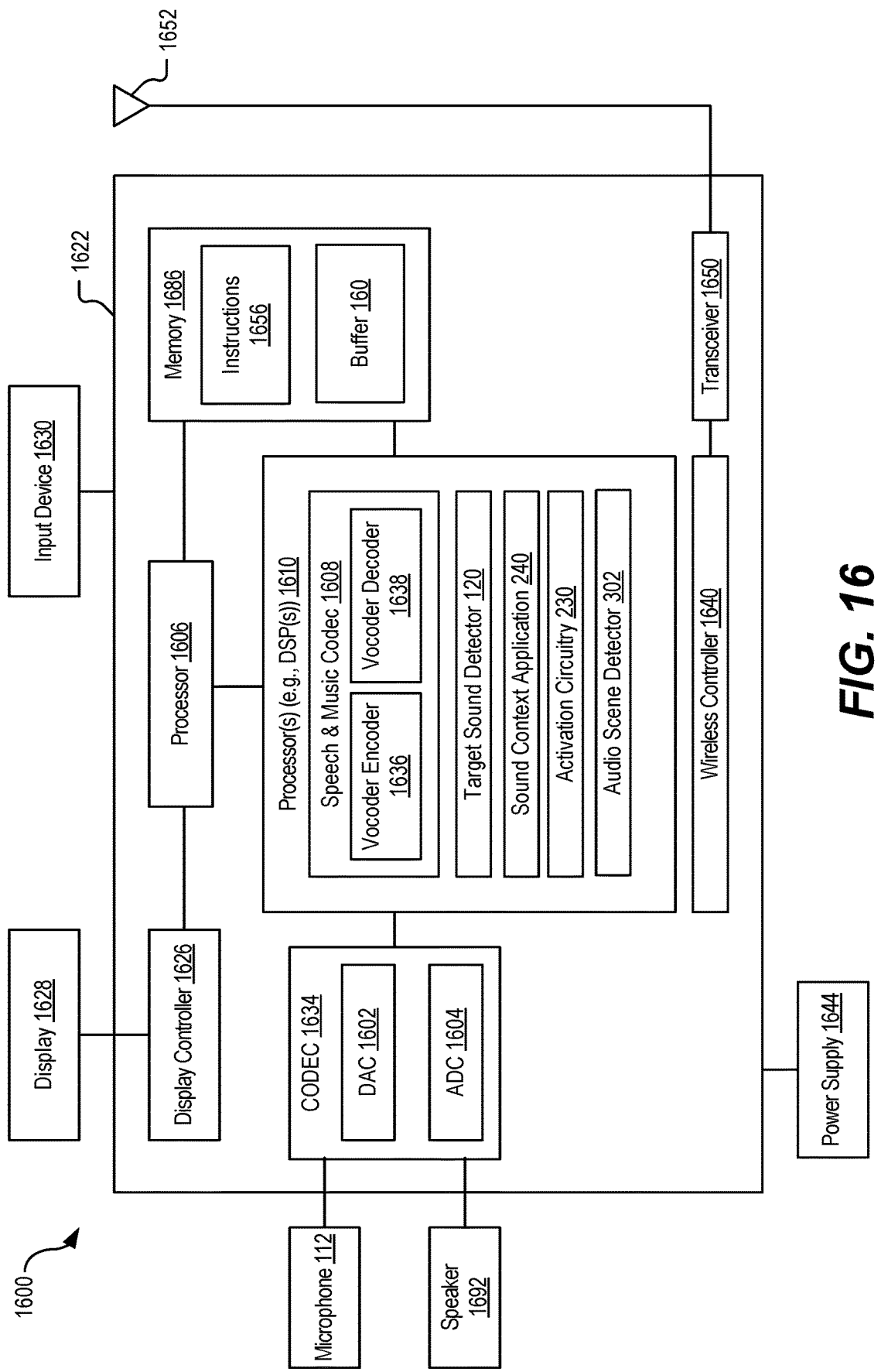
FIG. 16 is a block diagram of a particular illustrative example of a device that is operable to perform target sound detection, in accordance with some examples of the present disclosure.

FIG. 9 depicts an implementation 900 of the device 102 as an integrated circuit 902 that includes the one or more processors 160. The integrated circuit 902 also includes a sensor signal input 910, such as one or more first bus interfaces, to enable the audio signal 114 to be received from the microphone 112. For example, the sensor signal input 910 receives the audio signal 114 from the microphone 112 and provides the audio signal 114 to the buffer 130. The integrated circuit 902 also includes a data output 912, such as a second bus interface, to enable sending of the detector output 152 (e.g., to a display device, a memory, or a transmitter, as illustrative, non-limiting examples). For example, the target sound detector 120 provides the detector output 152 to the data output 912 and the data output 912 sends the detector output 152. The integrated circuit 902 enables implementation of multi-stage target sound detection as a component in a system that includes one or more microphones, such as a vehicle as depicted in FIG. 10 or 11, a virtual reality or augmented reality headset as depicted in FIG. 12, a wearable electronic device as depicted in FIG. 13, a voice-controlled speaker system as depicted in FIG. 14, or a wireless communication device as depicted in FIG. 16.

Figure 10:
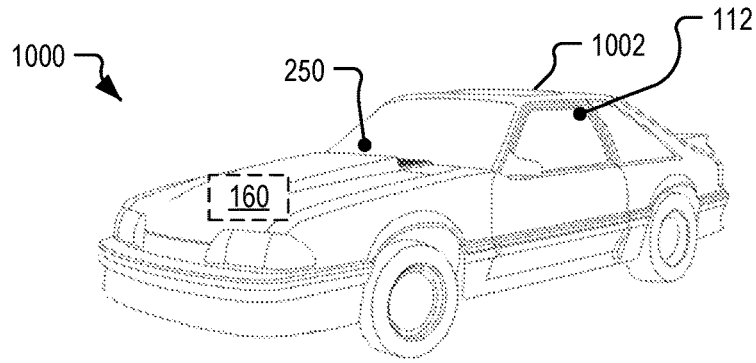
FIG. 10 is a diagram of a first example of a vehicle that includes a multi-stage target sound detector, in accordance with some examples of the present disclosure.

FIG. 10 depicts an implementation 1000 in which the device 102 corresponds to, or is integrated within, a vehicle 1002, illustrated as a car. In some implementations, multi-stage target sound detection can be performed based on an audio signal received from interior microphones, such as for a baby crying in the car, based on an audio signal received from external microphones (e.g., the microphone 112) such as for a siren, or both. The detector output 152 of FIG. 1 can be provided to a display screen of the vehicle 1002, to a mobile device of a user, or both. For example, the output device 250 includes a display screen that displays a notification indicating that a target sound (e.g., a siren) is detected outside the vehicle 1002. As another example, the output device 250 includes a transmitter that transmits a notification to a mobile device indicating that a target sound (e.g., a baby's cry) is detected in the vehicle 1002.

Figure 11:
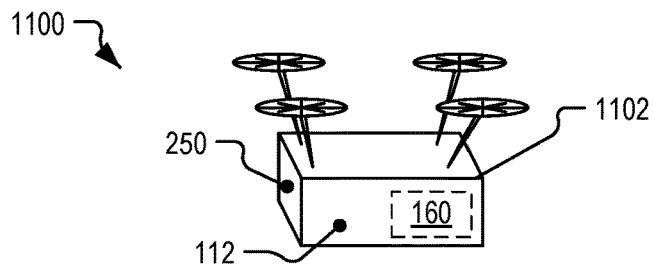
FIG. 11 is a diagram of a second example of a vehicle that includes a multi-stage target sound detector, in accordance with some examples of the present disclosure.

FIG. 11 depicts another implementation 1100 in which the device 102 corresponds to or is integrated within a vehicle 1102, illustrated as a manned or unmanned aerial device (e.g., a package delivery drone). Multi-stage target sound detection can be performed based on an audio signal received from one or more microphones (e.g., the microphone 112) of the vehicle 1102, such as for opening or closing of a door. For example, the output device 250 includes a transmitter that transmits a notification to a control device indicating that a target sound (e.g., opening or closing of a door) is detected by the vehicle 1102.

Figure 12:
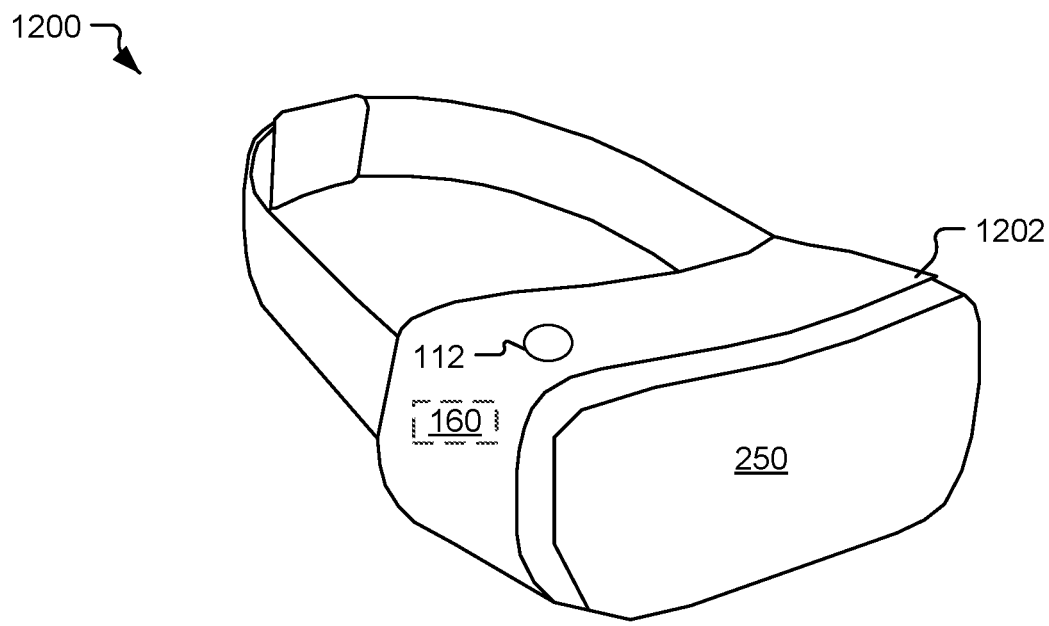
FIG. 12 is a diagram of a headset, such as a virtual reality or augmented reality headset, that includes a multi-stage target sound detector, in accordance with some examples of the present disclosure.

FIG. 12 depicts an implementation 1200 in which the device 102 is a portable electronic device that corresponds to a virtual reality, augmented reality, or mixed reality headset 1202. The one or more processors 160 and the microphone 112 are integrated into the headset 1202. Multi-stage target sound detection can be performed based on an audio signal received from the microphone 112 of the headset 1202. A visual interface device, such as the output device 250, is positioned in front of the user's eyes to enable display of augmented reality or virtual reality images or scenes to the user while the headset 1202 is worn. In a particular example, the output device 250 is configured to display a notification indicating that a target sound (e.g., a fire alarm or a doorbell) is detected external to the headset 1202.

FIG. 13 depicts an implementation 1300 in which the device 102 is a portable electronic device that corresponds to a wearable electronic device 1302, illustrated as a "smart watch." The one or more processors 160 and the microphone 112 are integrated into the wearable electronic device 1302. Multi-stage target sound detection can be performed based on an audio signal received from the microphone 112 of the wearable electronic device 1302. The wearable electronic device 1302 includes a display screen, such as the output device 250, that is configured to display a notification indicating that a target sound is detected by the wearable electronic device 1302. In a particular example, the output device 250 includes a haptic device that provides a haptic notification (e.g., vibrates) in response to detection of a target sound. The haptic notification can cause a user to look at the wearable electronic device 1302 to see a displayed notification indicating that the target sound is detected. The wearable electronic device 1302 can thus alert a user with a hearing impairment or a user wearing a headset that the target sound is detected.

FIG. 14 is an illustrative example of a wireless speaker and voice activated device 1400. The wireless speaker and voice activated device 1400 can have wireless network connectivity and is configured to execute an assistant operation. The one or more processors 160, the microphone 112, and one or more cameras, such as the camera 620, are included in the wireless speaker and voice activated device 1400. The camera 620 is configured to be activated responsive to the integrated assistant application 1402, such as in response to a user instruction to initiate a video conference. The camera 620 is further configured to be activated responsive to detection, by the binary target sound classifier 144 in the target sound detector 120, of the presence of any of multiple target sounds in the audio data from the microphone 112, such as to function as a surveillance camera in response to detection of a target sound.

The wireless speaker and voice activated device 1400 also includes a speaker 1404. During operation, in response to receiving a verbal command, the wireless speaker and voice activated device 1400 can execute assistant operations, such as via execution of an integrated assistant application 1402. The assistant operations can include adjusting a temperature, playing music, turning on lights, initiating a video conference, etc. For example, the assistant operations are performed responsive to receiving a command after a keyword (e.g., "hello assistant"). Multi-stage target sound detection can be performed based on an audio signal received from the microphone 142 of the wireless speaker and voice activated device 1400. In some implementations, the integrated assistant application 1402 is activated in response to detection, by the binary target sound classifier 144 in the target sound detector 120, of the presence of any of multiple target sounds in the audio data from the microphone 112. An indication of the identified target sound (e.g., the detector output 152) is provided to the integrated assistant application 1402, and the integrated assistant application 1402 causes the wireless speaker and voice activated device 1400 to provide a notification, such as to play out an audible speech notification via the speaker 1404 or to transmit a notification to a mobile device, indicating that a target sound (e.g., opening or closing of a door) is detected by the wireless speaker and voice activated device 1400.

Figure 15:
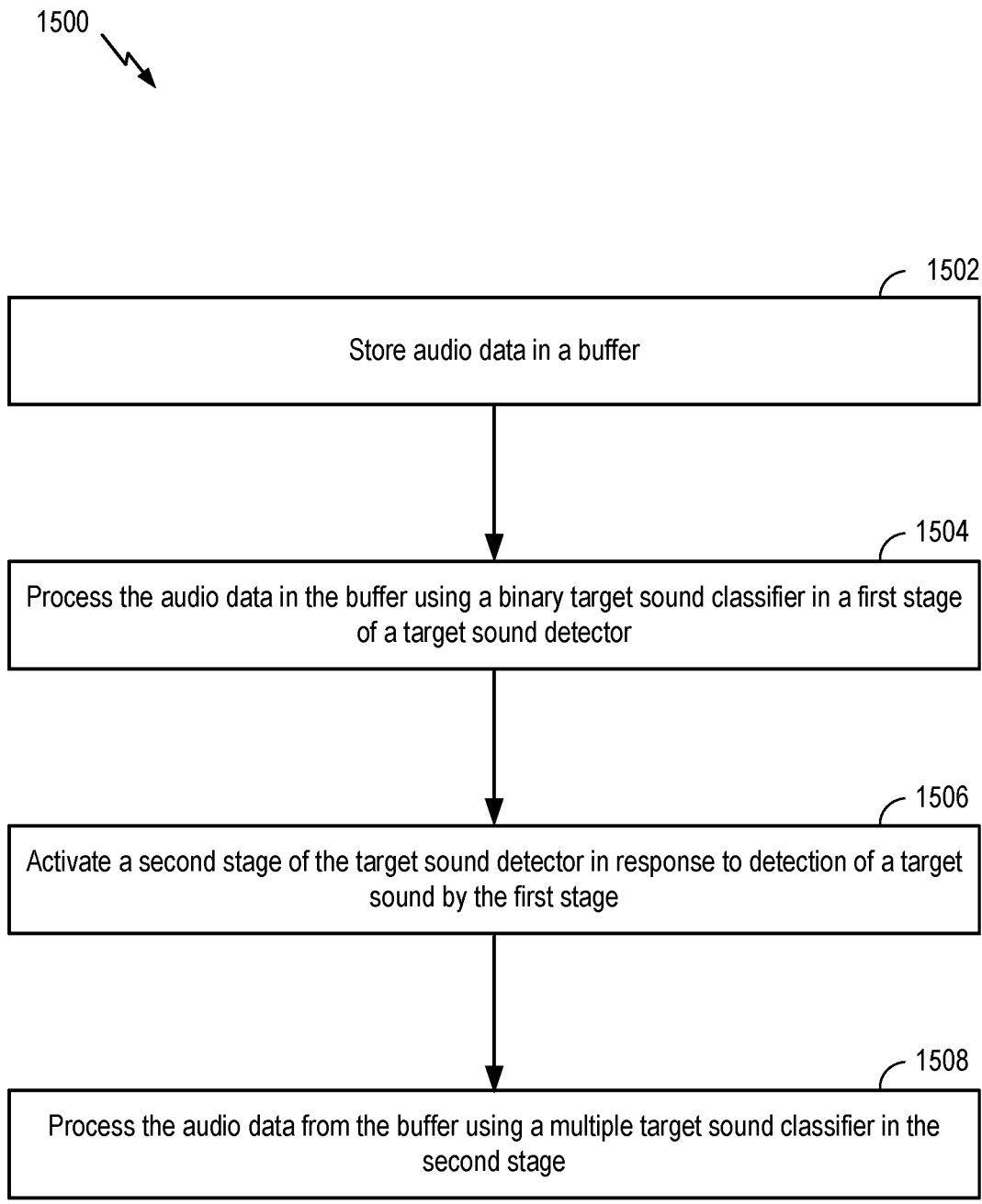
FIG. 15 is diagram of a particular implementation of a method of target sound detection that may be performed by the device of FIG. 1, in accordance with some examples of the present disclosure.

Referring to FIG. 15, a particular implementation of a method 1500 of multi-stage target sound detection is shown. In a particular aspect, one or more operations of the method 1500 are performed by at least one of the binary target sound classifier 144, the target sound detector 120, the buffer 130, the processor 160, the device 102, the system 100 of FIG. 1, the activation signal unit 204, the multiple target sound classifier 210, the activation circuitry 230, the sound context application 240, the output device 250, the system 200 of FIG. 2, the audio scene detector 302, the audio scene change detector 304, the audio scene classifier 308 of FIG. 3, the scene transition classifier 414 of FIG. 4, the hierarchical model change detector 514 of FIG. 5, the scene detector 606 of FIG. 6, or a combination thereof.

The method 1500 includes storing audio data in a buffer, at 1502. For example, the buffer 130 of FIG. 1 stores the audio data 132, as described with reference to FIG. 1. In a particular aspect, the audio data 132 corresponds to the audio signal 114 received from the microphone 112 of FIG. 1.

The method 1500 also includes processing the audio data in the buffer using a binary target sound classifier in a first stage of a target sound detector, at 1504. For example, the binary target sound classifier 144 of FIG. 1 processes the audio data 132 that is stored in the buffer 130, as described with reference to FIG. 1. The binary target sound classifier 144 is in the first stage 140 of the target sound detector 150 of FIG. 1.

The method 1500 further includes activating a second stage of the target sound detector in response to detection of a target sound by the first stage, at 1506. For example, the first stage 140 of FIG. 1 activates the second stage 150 of the target sound detector 120 in response to detection of the target sound 106 by the first stage 140, as described with reference to FIG. 1. In some implementations the binary target sound classifier and the buffer operate in an always-on mode, and activating the second stage includes sending a signal from the first stage to the second stage and transitioning the second stage from a low-power state to an active state responsive to receiving the signal at the second stage, such as described with reference to FIG. 2.

The method 1500 includes processing the audio data from the buffer using a multiple target sound classifier in the second stage, at 1508. For example, the multiple target sound classifier 210 of FIG. 2 processes the audio data 132 from the buffer 130 in the second stage 150, as described with reference to FIG. 2. The multiple target sound classifier may process the audio data based on multiple target sounds that correspond to multiple classes of sound events, such as the classes 290 or one or more of the sets of sound event classes 812-818, as illustrative, non-limiting examples.

The method 1500 can also include generating a detector output that indicates, for each of multiple target sounds, the presence or absence of that target sound in the audio data, such as the detector output 152.

In some implementations, the method 1500 also includes processing the audio data at an audio scene change detector, such as the audio scene detector 302 of FIG. 3. In such implementations, in response to detecting an audio scene change, the method 1500 includes activating an audio scene classifier, such as the audio scene classifier 308, and processing the audio data from the buffer using the audio scene classifier. The method 1500 may include classifying, at the audio scene classifier, the audio data according to multiple audio scene classes, such as the classes 330. In an illustrative example, the multiple audio scene classes include at least two of: at home, in an office, in a restaurant, in a car, on a train, on a street, indoors, or outdoors.

Detecting the audio scene change may be based on detecting changes in at least one of noise statistics or non-stationary sound statistics, such as described with reference to the audio scene change detector 304 of FIG. 3. Alternatively, or in addition, detecting the audio scene change may be performed using a classifier trained using audio data corresponding to transitions between scenes, such as the scene transition classifier 414 of FIG. 4. Alternatively, or in addition, the method 1500 can include detecting the audio scene change based on detecting changes between audio scene classes in a first set of audio scene classes (e.g., the reduced set of classes 530 of FIG. 5) and classifying the audio data according to a second set of audio scene classes (e.g., the classes 330 of FIG. 3), where a first count of the audio scene classes (e.g., 3) in the first set of audio scene classes is less than a second count of audio scene classes (e.g., 8) in the second set of audio scene classes.

Because the processing operations of the binary target sound classifier are less complex as compared to the processing operations performed by the second stage, the audio data processed at the binary target sound classifier consumes less power as compared to processing the audio data at the second stage. By selectively activating the second stage in response to detection of a target sound by the first stage, the method 1500 enables processing resources to be conserved and overall power consumption to be reduced.

The method 1500 of FIG. 15 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1500 of FIG. 15 may be performed by a processor that executes instructions, such as described with reference to FIG. 16.

Referring to FIG. 16, a block diagram of a particular illustrative implementation of a device is depicted and generally designated 1600. In various implementations, the device 1600 may have more or fewer components than illustrated in FIG. 16. In an illustrative implementation, the device 1600 may correspond to the device 102. In an illustrative implementation, the device 1600 may perform one or more operations described with reference to FIGS. 1-15.

In a particular implementation, the device 1600 includes a processor 1606 (e.g., a central processing unit (CPU)). The device 1600 may include one or more additional processors 1610 (e.g., one or more DSPs). The processors 1610 may include a speech and music coder-decoder (CODEC) 1608, the target sound detector 120, the sound context application 240, the activation circuitry 230, the audio scene detector 302, or a combination thereof. The speech and music codec 1608 may include a voice coder ("vocoder") encoder 1636, a vocoder decoder 1638, or both.

The device 1600 may include a memory 1686 and a CODEC 1634. The memory 1686 may include instructions 1656, that are executable by the one or more additional processors 1610 (or the processor 1606) to implement the functionality described with reference to the target sound detector 120, the sound context application 240, the activation circuitry 230, the audio scene detector 302, or any combination thereof. The memory 1686 may include the buffer 160. The device 1600 may include a wireless controller 1640 coupled, via a transceiver 1650, to an antenna 1652.

The device 1600 may include a display 1628 coupled to a display controller 1626. A speaker 1692 and the microphone 112 may be coupled to the CODEC 1634. The CODEC 1634 may include a digital-to-analog converter 1602 and an analog-to-digital converter 1604. In a particular implementation, the CODEC 1634 may receive analog signals from the microphone 112, convert the analog signals to digital signals using the analog-to-digital converter 1604, and provide the digital signals to the speech and music codec 1608. The speech and music codec 1608 may process the digital signals, and the digital signals may further be processed by one or more of the target sound detector 120 and the audio scene detector 302. In a particular implementation, the speech and music codec 1608 may provide digital signals to the CODEC 1634. The CODEC 1634 may convert the digital signals to analog signals using the digital-to-analog converter 1602 and may provide the analog signals to the speaker 1692.

In a particular implementation, the device 1600 may be included in a system-in-package or system-on-chip device 1622. In a particular implementation, the memory 1686, the processor 1606, the processors 1610, the display controller 1626, the CODEC 1634, and the wireless controller 1640 are included in a system-in-package or system-on-chip device 1622. In a particular implementation, an input device 1630 and a power supply 1644 are coupled to the system-on-chip device 1622. Moreover, in a particular implementation, as illustrated in FIG. 16, the display 1628, the input device 1630, the speaker 1692, the microphone 112, the antenna 1652, and the power supply 1644 are external to the system-on-chip device 1622. In a particular implementation, each of the display 1628, the input device 1630, the speaker 1692, the microphone 112, the antenna 1652, and the power supply 1644 may be coupled to a component of the system-on-chip device 1622, such as an interface or a controller.

The device 1600 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, or any combination thereof.

In conjunction with the described implementations, an apparatus to process an audio signal representing input sound includes means for detecting a target sound. The means for detecting the target sound includes a first stage and a second stage. The first stage includes means for generating a binary target sound classification of audio data and for activating the second stage in response to classifying the audio data as including the target sound. For example, the means for detecting the target sound can correspond to the target sound detector 120, the one or more processors 160, the one or more processors 1610, one or more other circuits or components configured to detect a target sound, or any combination thereof. The means for generating the binary target sound classification and for activating the second stage can correspond to the binary target sound classifier 144, one or more other circuits or components configured to generate binary target sound classification and to activate the second stage, or any combination thereof.

The apparatus also includes means for buffering the audio data and for providing the audio data to the second stage in response to the classification of the audio data as including the target sound. For example, the means for buffering the audio data and for providing the audio data to the second stage can correspond to the buffer 160, the one or more processors 160, the one or more processors 1610, one or more other circuits or components configured to buffer audio data and providing the audio data to the second stage in response to the classification of the audio data as including the target sound, or any combination thereof.

In some implementations, the apparatus further includes means for detecting an audio scene, the means for detecting the audio scene including means for detecting an audio scene change in the audio data and means for classifying the audio data as a particular audio scene in response to detection of the audio scene change. For example, the means for detecting an audio scene can correspond to the audio scene detector 302, the one or more processors 160, the one or more processors 1610, one or more other circuits or components configured to detect an audio scene, or any combination thereof. The means for detecting an audio scene change in the audio data can correspond to the audio scene change detector 304, the scene transition classifier 414, the hierarchical model change detector 514, one or more other circuits or components configured to detect an audio scene change in the audio data, or any combination thereof. The means for classifying the audio data as a particular audio scene in response to detection of the audio scene change can correspond to the audio scene classifier 308, one or more other circuits or components configured to classify the audio data as a particular audio scene in response to detection of the audio scene change, or any combination thereof.

In some implementations, a non-transitory computer-readable medium (e.g., the memory 1686) includes instructions (e.g., the instructions 1656) that, when executed by one or more processors (e.g., the one or more processors 1610 or the processor 1606), cause the one or more processors to perform operations to store audio data in a buffer (e.g., the buffer 130) and to process the audio data in the buffer using a binary target sound classifier (e.g., the binary target sound classifier 144) in a first stage of a target sound detector (e.g., the first stage 140 of the target sound detector 120). The instructions, when executed by the one or more processors, also cause the one or more processors to activate a second stage of the target sound detector (e.g., the second stage 150) in response to detection of a target sound by the first stage and to process the audio data from the buffer using a multiple target sound classifier (e.g., the multiple target sound classifier 210) in the second stage.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to perform sound detection, comprising:
 a memory including a buffer configured to store audio data;
 one or more processors, coupled to the memory, configured to:
  receive the audio data from the buffer;
  detect the presence or absence of one or more target non-speech sounds in the audio data; and
  generate a user interface signal, to indicate that one of the one or more target non-speech sounds have been detected, and provide the user interface signal to a display device; and
 the display device is configured to output a visual representation identifying a type of the one or more target non-speech sounds that has been detected.

2. The device of claim 1, wherein the one or more processors are configured to selectively detect the presence or absence of the one or more target non-speech sounds via a neural network.

3. The device of claim 1, wherein the one or more processors are configured to select, from among one or more sets of trained data, a particular set of trained data that corresponds to a detected environment of the device and to process the audio data based on the particular set of trained data.

4. The device of claim 3, further comprising a camera configured to provide image data to the one or more processors, and wherein the environment is detected based on the image data from the camera.

5. The device of claim 3, further comprising a location detection system configured to provide location data to the one or more processors, and wherein the environment is detected based on the location data from the location detection system.

6. The device of claim 3, further comprising an audio scene detector configured to process the audio data, and wherein the environment is detected based on an output of the audio scene detector.

7. The device of claim 1, wherein the one or more processors are configured to wirelessly transmit the user interface signal to a watch.

8. The device of claim 1, further comprising one or more speakers configured to render the one or more target non-speech sounds.

9. The device of claim 1, further comprising one or more microphones configured to detect the audio data.

10. The device of claim 1, wherein the one or more processors comprise a first stage of a target sound detector and a second stage of the target sound detector.

11. The device of claim 10, wherein the first stage is configured to output a signal with a first value responsive to detection of a first sound of the one or more target non-speech sounds, the first stage configured to output the signal with the first value responsive to detection of a second sound of the one or more target non-speech sounds, and wherein the second stage is configured to output a target detector output with a second value responsive to detection of the first sound, the second stage configured to output the target detector output with a third value responsive to detection of the second sound.

12. The device of claim 11, wherein the first stage is configured to activate the second stage responsive to detection of one of the one or more target non-speech sounds, wherein the one or more target non-speech sounds include a first target sound and a second target sound, wherein the second stage includes a multiple target sound classifier configured to generate the target detector output.

13. The device of claim 11, wherein the first stage and the buffer are included in a low-power domain and are configured to operate in an always-on mode, and wherein the second stage is configured to transition from a low-power state to an active state responsive to reception of the signal.

14. The device of claim 1, wherein the one or more processors are configured to activate a camera in response to the detection of the one of the one or more target non-speech sounds.

15. The device of claim 14, further comprising a scene detector configured to classify an environment of the device at least partially based on an input signal from the camera, wherein the one or more processors are configured to classify the audio data from among one or more classes of sound events, and wherein detection of the presence or absence of one or more target non-speech sounds is at least partially based on the environment classified by the scene detector.

16. The device of claim 15, wherein the one or more processors are adjusted to focus on one or more particular classes of the one or more classes of sound events that correspond to the environment.

17. The device of claim 15, wherein the one or more processors are configured to:
select a particular set of sound event classes that correspond to the environment from among multiple sets of sound event classes; and
classify the audio data based on the sound event classes of the particular set.

18. The device of claim 1, further comprising an audio scene classifier that is configured to classify the audio data according to multiple audio scene classes.

19. The device of claim 18, further comprising an audio scene change detector that is configured to detect an audio scene change based on detecting changes in at least one of noise statistics or non-stationary sound statistics, wherein a target sound detected is a first target sound responsive to an audio scene being a first audio scene and is a second target sound responsive to the audio scene being a second audio scene.

20. The device of claim 19, wherein the noise statistics corresponds to an average spectral energy distribution of audio frames that are identified as containing noise, the non-stationary sound statistics corresponds to an average spectral energy distribution of audio frames that are identified as containing non-stationary sound, or a combination thereof.

21. The device of claim 19, wherein the audio scene change detector includes a classifier trained using audio data corresponding to transitions between scenes.

22. The device of claim 1, further comprising an audio scene change detector that corresponds to a hierarchical detector, wherein the audio scene change detector is configured to detect an audio scene change based on detection of changes between audio scene classes in a first set of audio scene classes, and wherein an audio scene classifier is configured to classify the audio data according to a second set of audio scene classes, wherein a first count of the audio scene classes in the first set of audio scene classes is less than a second count of the audio scene classes in the second set of audio scene classes.

23. The device of claim 1, wherein the presence or absence of one or more target non-speech sounds in the audio data is detected selectively based on an audio scene.

24. The device of claim 1, wherein the one or more processors are configured to generate the user interface signal, to indicate a different one of the one or more target non-speech sound have been detected and provide the user interface signal to the display device.

25. The device of claim 24, wherein the display device is configured to output a different visual representation associated with the one or more target non-speech sounds have been detected.

26. A method of target sound detection, the method comprising:
storing audio data in a buffer;
detecting the presence or absence of one or more target non-speech sounds in the audio data;
generating a user interface signal that indicates that one of the one or more target non-speech sounds has have been detected; and
providing the user interface signal to a display device that outputs a visual representation associated with the one of the one or more target non-speech sounds that have been detected, the visual representation identifying a type of the one or more target non-speech sounds that has been detected.

27. A non-transitory computer-readable storage device storing instructions that, when executed by one or more processors, cause the one or more processors to:
- store audio data in a buffer;
- detect the presence or absence of one or more target non-speech sounds in the audio data;
- generate a user interface signal that indicates that one of the one or more target non-speech sounds have been detected; and
- provide the user interface signal to a display device configured to output a visual representation associated with the one of the one or more target non-speech sounds that have been detected, the visual representation identifying a type of the one or more target non-speech sounds that has been detected.

* * * * *